(12) United States Patent
Young

(10) Patent No.: US 9,353,882 B2
(45) Date of Patent: May 31, 2016

(54) LOW PROFILE HYDRAULIC ACTUATOR

(71) Applicant: Array Holdings, Inc., Houston, TX (US)

(72) Inventor: Terry Glenn Young, Longview, TX (US)

(73) Assignee: Safoco, Inc., Houston, TX (US)

( * ) Notice: Subject to any disclaimer, the term of this patent is extended or adjusted under 35 U.S.C. 154(b) by 274 days.

(21) Appl. No.: 13/645,617

(22) Filed: Oct. 5, 2012

(65) Prior Publication Data

US 2013/0248001 A1 Sep. 26, 2013

Related U.S. Application Data

(60) Provisional application No. 61/615,693, filed on Mar. 26, 2012.

(51) Int. Cl.
| | |
|---|---|
| *F16K 37/00* | (2006.01) |
| *F16K 31/122* | (2006.01) |
| *F16K 31/163* | (2006.01) |
| *F16K 3/02* | (2006.01) |

(52) U.S. Cl.
CPC .............. *F16K 31/163* (2013.01); *F16K 3/0254* (2013.01); *F16K 31/1221* (2013.01); *F16K 37/0008* (2013.01); *F16K 37/0016* (2013.01); *Y10T 137/0396* (2015.04); *Y10T 137/0514* (2015.04); *Y10T 137/8275* (2015.04); *Y10T 137/8292* (2015.04)

(58) Field of Classification Search
CPC .............. F16K 31/163; F16K 31/1221; F16K 37/0008; F16K 37/0016; Y10T 137/8275; Y10T 137/8292; Y10T 137/0514

USPC ............ 137/556, 556.3, 15.23; 251/291, 63.6
See application file for complete search history.

(56) References Cited

U.S. PATENT DOCUMENTS

| | | | |
|---|---|---|---|
| 3,608,912 A | | 9/1971 | Templin |
| 3,771,540 A | * | 11/1973 | Wicke .............................. 137/75 |
| 3,896,835 A | | 7/1975 | Wicke |
| RE29,322 E | | 7/1977 | Nelson |
| 4,129,283 A | | 12/1978 | Taylor |
| 4,135,547 A | | 1/1979 | Akkerman et al. |
| 4,157,167 A | | 6/1979 | Akkerman |
| 4,271,857 A | | 6/1981 | Rowe |
| 4,372,333 A | | 2/1983 | Goans |
| 4,518,329 A | * | 5/1985 | Weaver .......................... 417/566 |
| 4,568,058 A | | 2/1986 | Shelton |
| 4,585,207 A | | 4/1986 | Shelton |
| 4,682,757 A | | 7/1987 | Shelton |
| 5,067,510 A | | 11/1991 | Breaux et al. |
| 6,015,134 A | | 1/2000 | Johnson |
| 6,250,605 B1 | * | 6/2001 | Young ............................ 251/291 |
| 2008/0083891 A1 | * | 4/2008 | Holliday ........................ 251/63.6 |

OTHER PUBLICATIONS

Axelson, "Manumatic" Diaphragm Gate Valve Actuator, (dated 1985 according to opposing counsel in pending litigation).

(Continued)

*Primary Examiner* — Atif Chaudry
(74) *Attorney, Agent, or Firm* — Bushman Werner, P.C.

(57) ABSTRACT

Hydraulic valve apparatuses with a low profile and without a top shaft are disclosed. Additionally, hydraulic valve apparatuses with indicator markers and side windows are disclosed.

15 Claims, 3 Drawing Sheets

(56) References Cited

OTHER PUBLICATIONS

W-K-M Surface Safety System; Cooper Industries; Flow Control; Catalog S, Issue 5, Copyright 1989; (pp. 1-24).
Cameron; Oil Tool Products 1970-1971; AutomaticSafetyValve; (pp. 2); (Undated).
LCR Actuator; Operating Manual for Cameron LC ROCS-1 Actuators Which Meet ANSI/ASME SPPE-1 and API Specification 14D Requirements; Cameron Iron Works, Inc.; SD-1627; Mar. 1971; (pp. 1-21).
Description of Cameron Type "A" Fail-Safe Valve; Cooper Iron Works, Inc., Engineering Bulleting No. 170; Dec. 5, 1969; (pp. 1-7).
Baker CAC, Inc.; Bonnet Assembly; Unite No. 880-66-7341; Jun. 15, 1999; (pp. 1).
McEvoy-Willis; Surface Safety Valve (SSV) Hydraulic Actuator; Catalog No. 103-A; Feb. 1987; (pp. 8).
Cameron Oil Tool Division; Gate Valves; Cameron Iron Works, Inc. 1997; (pp. 7).
Cameron Iron Works, Inc.; LCR and HLCR Actuators and Accessories, 1986-1987 General Catalog; (pp. 2).
Cameron Iron Works, Inc.; Cameron Automatic Safety Valves; Cameron Oil Products 1972-1973; (pp. 3).
Cameron Iron works, Inc.; Cameron Gate Valve Products; (Undated); (pp. 1312-1342).
Gray Tool Company; Graysafe(TM) Hydraulic and Pneumatic Actuators, (4/81) 10m 10/820.
Axelson Incorporated; Condensed Catalog, (pp. ICC 0001417-ICC-0001442); pre 1982.

\* cited by examiner

LOW PROFILE HYDRAULIC ACTUATOR

CROSS REFERENCE TO RELATED APPLICATIONS

This application claims priority to provisional application 61/615,693 filed Mar. 26, 2012.

FIELD

The present invention pertains to valves and actuators. More specifically, the present invention pertains to different configurations of hydraulic actuators which are useful in the petroleum industry.

BACKGROUND

Gate valves are generally comprised of a valve body having a central axis aligned with inlet and outlet passages, and a space between the inlet and outlet passages in which a slide, or gate, may be moved perpendicular to the central axis to open and close the valve. In the closed position, the gate surfaces typically seal against sealing rings which surround the fluid passage through the valve body. Gate valves have been used for centuries to control the flow of a great variety of fluids. Often the fluid to be controlled by the gate valve is under pressure. In the petroleum industry, gate valves are used along piping at various locations, and in particular are used in piping referred to in the petroleum industry as a Christmas tree, which is used as part of a drilling operation.

Actuators to open and close the gate valves may include manual operators, diaphragm-type operators, and hydraulic operators. The actuator may include a bonnet assembly, which interconnects the valve body and the valve gate, and a bonnet stem which is movable with the gate via an operator. The operator typically has a maximum force capability for applying to the bonnet stem. It is sometimes desirable to provide additional opening/closing power on a temporary basis without having to remove the original operator. It is also desirable that the same operator be adaptable to various control accessories, such as a mechanical override, hydraulic override, heat sensitive lock open device, block open cap, electrical limit switch and/or other electrical accessories.

In some cases, the positioning of the gate valves in the christmas tree and other types of installations may be restricted because of piping which is supplied to operate an automatic actuator that controls gate movement. In the past, it has been difficult to use precisely laid piping because the position of the operator fluid port is fixed with respect to the operator housing. Allowing the operator to rotate with respect to the bonnet could result in leakage or cause misalignment of the up-stop and down-stop drift adjustments of the valve gate.

Thus, there has been a long felt need in the industry to provide an improved actuator that allows a more adaptable installation configuration, that reduces maintenance and installation time, and that increases long term durability. Persons skilled in the art will appreciate the present invention which provides solutions to these and other problems associated with valve actuators.

SUMMARY

Particular embodiments of the invention pertain to an actuator for moving a valve gate between open and closed valve positions within a valve body, the actuator comprising: an actuator housing having a proximal end oriented toward a gate valve and a distal end oriented away from the gate valve; an operator shaft with a distal end and a proximal end, the distal end having a partial bore for accepting a top shaft, the proximal end extending through a bore of a packing retainer fitted within an internal bore of a bonnet and into the valve body, the bonnet operatively connected to the proximal end of the actuator housing, and the operator shaft defining a shaft axis; a hydraulic pressure chamber aligned along the shaft axis and positioned distal to a piston, the piston having a proximal end and a distal end; a downstop having a proximal side and a distal side and having a bore between the proximal side and distal side, the bore being adapted to receive the top shaft, the downstop further having a plurality of spring retainers extending proximally from the spaced annularly around the proximal side of the downstop; and wherein a change in hydraulic fluid pressure the hydraulic pressure chamber operatively results in movement of the piston in a proximal direction or distal direction, and wherein movement of the piston in a proximal or distal direction causes the operator shaft to move in a proximal direction or distal direction to open or close the gate valve.

In such embodiments, the actuator may further comprise a spring having an outer diameter, the spring being capable of producing a biasing force opposing axial movement of the operator shaft toward the valve body.

In embodiments of the invention pertaining to the spring retainers, the spring retainers may have an inner side oriented toward the spring such that the distance from the inner side of a spring retainer to the inner side of another spring retainer 180 degrees apart is greater than or equal to the outer diameter of the spring. Still further, the proximal ends of the spring retainers may possess indicator markers oriented away from the operator shaft.

In further embodiments of the invention, the actuator comprises an indicator window located on the actuator housing, wherein the indicator window allows a user to view the indicator markers.

Other embodiments of the invention related to the actuator pertain to the packing retainer, in such embodiments, the packing retainer has a distal end and may be capable of receiving drift shims positioned on the distal end.

In other embodiments of the invention, the actuator further comprises a top shaft with a distal end and a proximal end, the top shaft positioned proximal to the piston, the top shaft having a proximal end and distal end. Likewise, the operator shaft may have a distal end comprising a partial bore adapted to receive the proximal end of the top shaft. Still further, the downstop may have a bore and may be retained between the distal end of the top shaft and the distal end of the operator shaft.

In other aspects of the invention, the actuator has a proximal end functioning as a bonnet ring with a bonnet ring bore. In such instances, the bonnet ring bore is threaded and adapted to receive a threaded bonnet stem.

In further embodiments of the invention concerning the spring, the spring may have a distal end in contact with the proximal side of the downstop and wherein the spring has a proximal end in contact with the bonnet ring.

Other embodiments of the invention concern a method of determining whether a gate valve without an external top shaft is in an open or closed valve position by a hydraulic actuator, the method comprising: obtaining a hydraulic actuator having an actuator housing with a side window and with the housing having a proximal end oriented toward a gate valve and a distal end oriented away from the gate valve, the actuator possessing a plurality of spring retainers and at least one indicator marker oriented toward the side window; applying or removing hydraulic pressure from or to a hydraulic chamber, thereby causing a piston within the actuator and an indicator marker within the actuator to move in a proximal direction or distal direction; and wherein viewing the position of the at least one indicator marker via the side window allows a user to determine whether the valve is open or closed.

In further embodiments of the method at least one indicator marker faces the side window. Further, the marker may be positioned at a proximal location on a spring retainer.

Referring to the spring retainers in this method, the plurality of spring retainers may have a proximal end and a distal end, the distal end of the spring retainers connected to a proximal end of a downstop.

In applications of the method, wherein the valve is a fail closed valve, a distal position of an indicator relative to the side window indicates that the valve is closed. Likewise, a proximal position of an indicator relative to the side window indicates that the valve is open.

In further embodiments of the method, regarding the viewing window located on the side of the actuator housing, the indicator window is glass, acrylic, quartz or sapphire crystal. In other embodiments, the window is open and contains no transparent material.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

Figure 1:
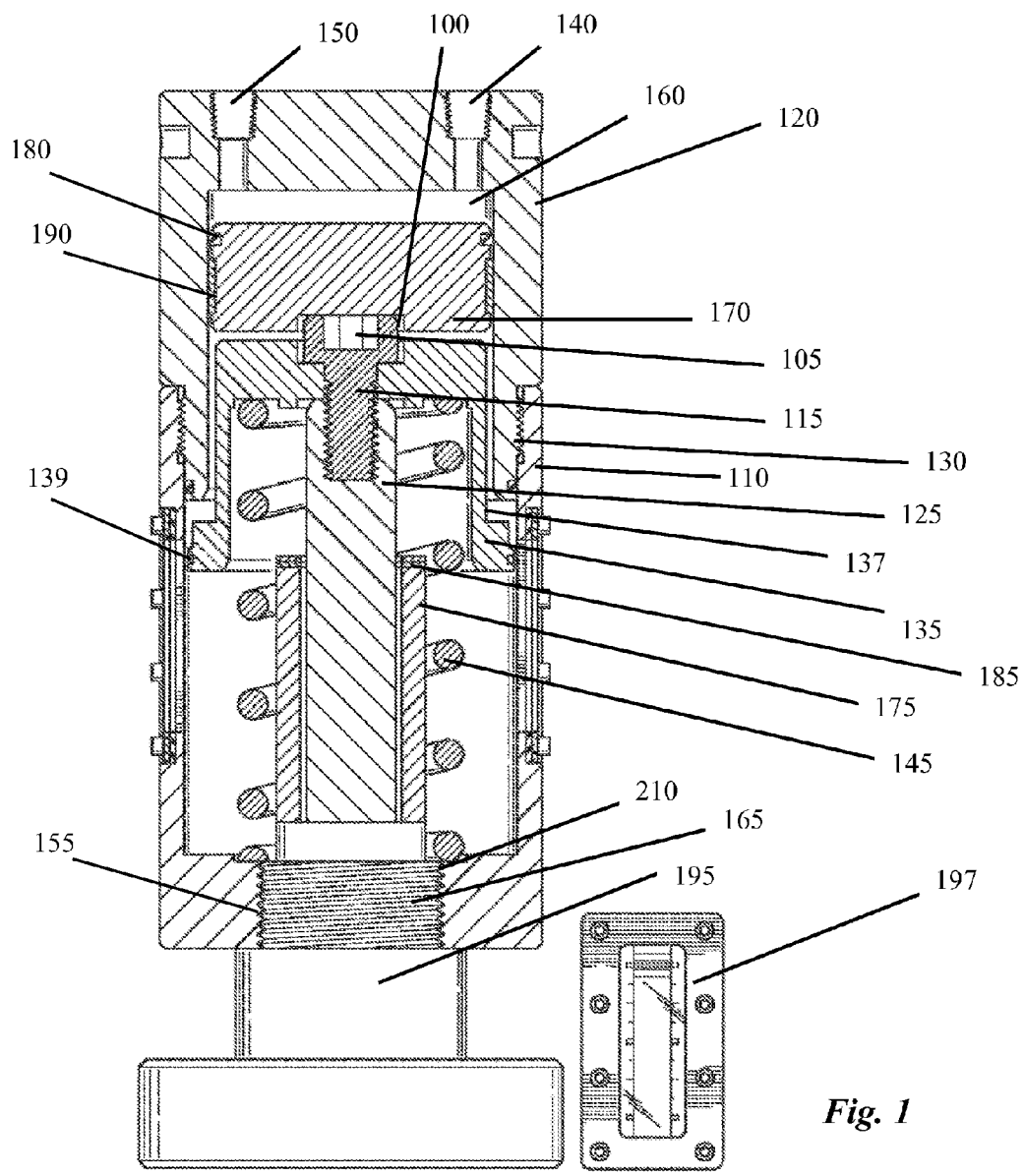
FIG. 1 is a cross sectional illustration of a low profile piston hydraulic actuator.

LIST OF REFERENCE NUMERALS 100 piston indentation
105 top shaft receiver
110 low profile actuator housing
115 low profile top shaft
120 low profile top cap
125 operator shaft
130 threaded joint
135 downstop
137 spring retainers
139 indicator marker
140 hydraulic pressure entry port
145 central spring
150 hydraulic pressure exit port
153 pressure relief valve
155 threaded bore
160 hydraulic chamber
165 bonnet stem
170 low profile actuator piston
175 packing retainer
180 polypack seals
185 drift shims
190 ware bearings
195 bonnet
197 indicator window
200 valve assembly
210 bonnet ring bore
220 bonnet bore

DETAILED DESCRIPTION

Introduction

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings making apparent to those skilled in the art how the several forms of the invention may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3rd Edition.

Distal, in certain instances, can be defined as toward the top of the actuator and away from any valve on which the actuator rests.

Proximal, in certain instances, can be defined as toward a valve on which an actuator is mounted and away from the top of the actuator.

Stainless steel, in certain instances, can be defined as any iron alloy generally resistant to oxidation.

Hydraulic, in certain instances, can be defined as a fluid which can be placed under pressure in order to move parts of mechanical devices. Examples of hydraulic fluids include, but are not limited to water, oils, colloidal suspensions, alcohols and the like. Commercially available hydraulic fluids are readily available.

In certain embodiments the hydraulic actuator may not possess a top shaft. As illustrated in FIG. 1, a hydraulic actuator is shown with a low profile actuator housing 110 connected to a low profile top cap 120 through a threaded joint 130. A typical low profile actuator housing 110 can be between about 10 inches to about 30 inches in diameter. The shape is generally cylindrical and can be made from strong metal alloys, ceramics and the like. In preferred embodiments, the cylinder is made of stainless steel with about a ¼ to ½ inch thickness.

One particular advantage of an actuator not having a top shaft, is that the actuator can be low profile and fit in tight spaces where the extension of a top shaft would damage other equipment.

In the aforementioned embodiment, the top cap 120 possesses a hydraulic pressure entry port 140 and a hydraulic pressure exit port 150. As with the low profile actuator housing 110, the top cap 120 can also be made of rigid material, such as stainless steel, a polymer or a ceramic. In general, the top cap, which contains a hydraulic pressure entry port 140 and a hydraulic pressure exit port 150 may need to withstand pressure of 50 psi, 100 psi, 200 psi, 300 psi, 400 psi, 500 psi, 600 psi, 700 psi, 800 psi, 900 psi, 1000 psi, 2000 psi, 4000 psi, 5000 psi, 6000 psi, 7000 psi, 8000 psi, 9000 psi 10,000 psi or greater or some amount in between the aforementioned pressure points. The hydraulic pressure exit port may further possess a burst disc or plug to prevent unwanted seepage of hydraulic fluid under pressure under the same pressures as indicated above.

When hydraulic fluid enters the hydraulic pressure entry port 140, it travels to the hydraulic chamber 160, which provides pressure to move the low profile actuator piston 170. The low profile actuator piston 170 fits within the top cap 120. In this regard like the top cap, the piston is cylindrical in shape. However, the top cap has an inner diameter greater than or equal to the diameter of the piston. In implementation, the diameter of the piston is slightly less than the inner diameter of the top cap, and leakage of hydraulic fluid is prevented by seals such as o-rings or preferably polypack seals 180 and ware bearings 190 spaced between the side of the low profile actuator piston 170 and the interior of the top cap 120.

As the low profile actuator piston 170 moves in a proximal direction due to hydraulic pressure the low profile actuator piston presses against a low profile top shaft receiver 105, situated proximal to the low profile actuator piston 170. The low profile actuator piston 170 possesses a piston indentation 100, which is adapted to receive the low profile top shaft receiver 110. However, in some embodiments, the piston indentation 100 may not be present. The top shaft receiver 105 is distal to the low profile top shaft 115. Thus, although the low profile actuator has a top shaft, it does not extend out of the actuator and is instead proximal to the low profile actuator piston.

The top shaft 115 is positioned between the top shaft receiver 105 at its distal end and an operator shaft 125 at its proximal end. Between the top shaft receiver 105 and the operator shaft 125 is a downstop 135 with an internal aperture for receiving the top shaft 115. In particular embodiments, the downstop possesses a plurality of spring retainers 137 extending proximally from the proximal side of the downstop and spaced annularly around the downstop 135 such that the distance from one spring retainer to another spring retainer spaced 180 degrees apart is equal to or greater than the diameter of the central spring 145 as discussed below. In certain embodiments, the spring retainers 137 form a continuous circle around the downstop such that there is no space between one spring retainer and another spring retainer. In the aforementioned embodiments, proximal to the downstop 135 the central spring 145 surrounds the operator shaft 125.

At the proximal end of the low profile actuator housing 110 is a threaded bore centered within the proximal end said low profile actuator housing 110. The threaded bore 155 is adapted to receive a threaded bonnet stem 165, such that the bonnet stem is affixed to the bore. However, it is contemplated that in certain embodiments, the method of affixing may not be through a threaded interaction, but rather welding, pinning, or casting. Likewise, in certain embodiments, the low profile actuator housing 110 may be connected to but separate from the proximal end, wherein a bonnet ring is present as detailed in previous embodiments. In such instances, the bonnet stem 165 would be affixed to the bonnet ring, which in turn would be affixed to the actuator housing. The bonnet ring would be affixed to the actuator housing in any appropriate manner such as with bolts, with threading, pinning or welding. Further sealing the bonnet stem and housing is one or more O-rings which surround the bonnet stem.

Further, the central spring 145 has a diameter large enough to surround the operator shaft 125 and the packing retainer 175. The distal end of the central spring 145 abuts the downstop 135, while the proximal end of the central spring rests within the proximal portion of the actuator housing, surrounding the threaded bore 155.

The bonnet stem 165 further possesses a bonnet stem bore, which may be threaded, and is adapted to receive a packing retainer 175. The packing retainer 175 has an internal bore adapted to receive the operator shaft 125. The distal end of the packing retainer 175 may be mounted with drift shims 185 which are used to adjust the drift of the valve. The proximal end of the packing retainer 175 is affixed to the bonnet stem 165. The bonnet stem 165 is positioned on the bonnet 195.

Of note, in a particular embodiment, the housing may possess an indicator window 197 on the side of the housing. The indicator window may be an actual window made of glass, quartz, acrylic, sapphire crystal and the like. Alternatively, the window may be empty of such materials such that a user can see into the actuator. The indicator window may be advantageous in determining the status of the valve (opened or closed) on which the actuator sits. This may be advantageous in the case of a hydraulic actuator lacks the presence of an external portion of a top shaft. In typical hydraulic valve actuators, the top shaft will serve as an indicator of whether a valve is opened or closed depending on the length of top shaft coming out of the distal portion of the actuator. In the case of the window, a user of the actuator, such as an oil field worker or engineer, can look through the window and see an indicator marker 139 in order to determine whether the valve is open or closed by looking at indicator marks on the outside edge of the proximal end of the spring retainers.

The indicator marker 139 may simply be the outside edge of the proximal end of the spring retainers, or there may be some color difference such as a painted edge or other surface modifications so that the user can see the outside edge of the proximal end of the spring retainer. In other embodiments, the indicator markers may be tritium gas tubes or glow in the dark paint or other commonly used markers as seen in watches and the like. As used herein, outside edge refers to a direction opposite of the spring.

Figure 2:
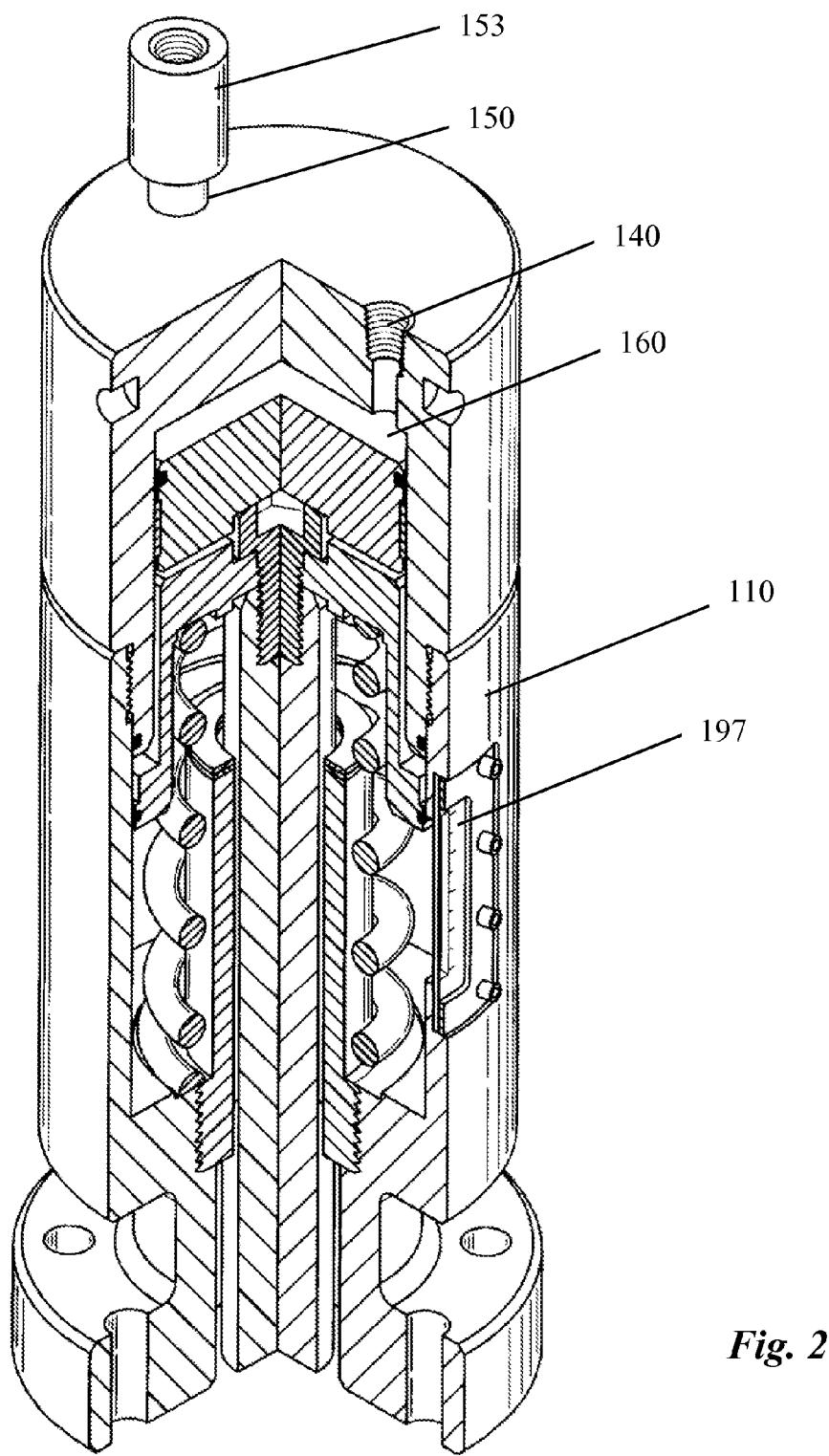
FIG. 2 is an external, cut away illustration of a low profile piston hydraulic actuator.
Figure 3:
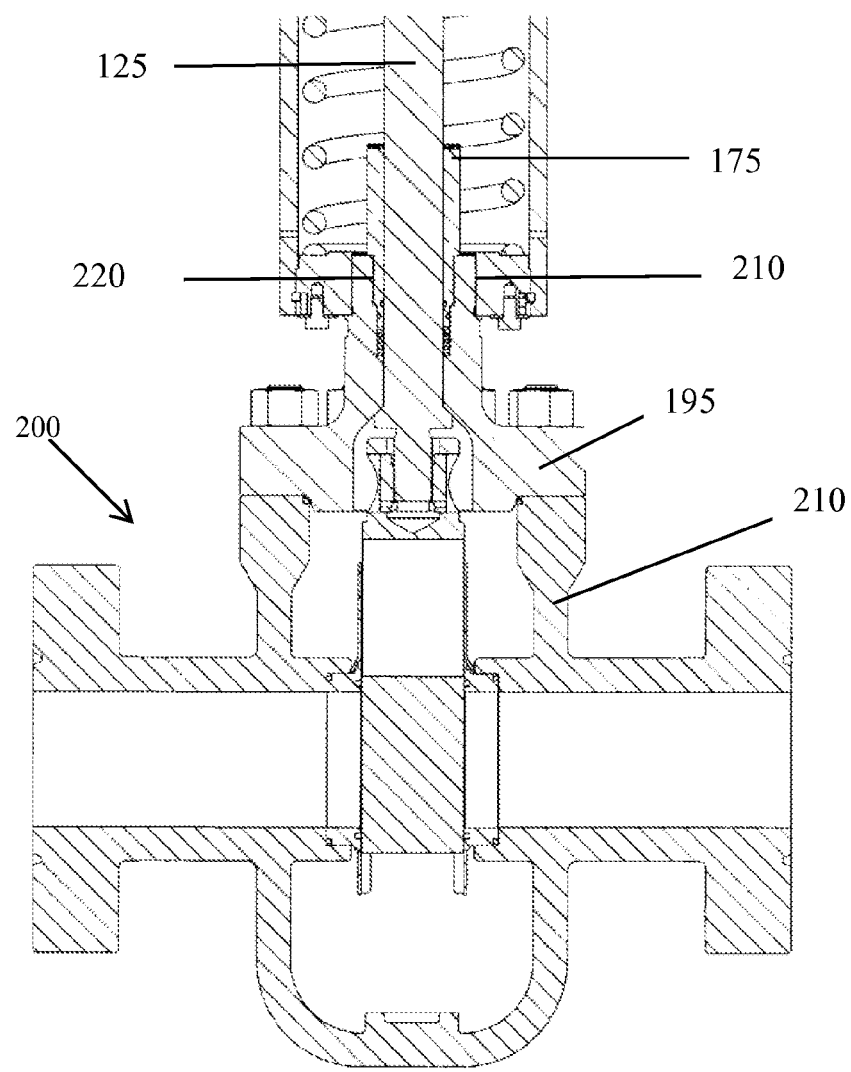
FIG. 3 is a cross sectional illustration of an operator shaft and valve assembly of a low profile hydraulic actuator.

As seen from FIG. 2, a one quarter cut out of the hydraulic actuator is shown. The one quarter cut out depicts the indicator window 197 on the outside surface of the low profile actuator housing 110. As can be further depicted, the proximal end of the hydraulic actuator is attached to a bonnet 195, which itself is typically attached to a valve body as depicted in FIG. 3. Further depicted in FIG. 2 is a hydraulic pressure entry port 140 and a hydraulic pressure exit port 150. The hydraulic pressure exit port 150 is depicted as being fitted with a pressure relief valve 153. The pressure relief valve may be adjustable or pre-set to a particular pressure to prevent over pressurization of the hydraulic chamber 160. In certain embodiments, the pressure may be set at 50 psi, 100, 200, 300, 400, 500, 600, 700, 800, 900, 1000, 2000, 3000, 4000, 5000 psi or some interval therein.

As seen from FIG. 3, the bonnet 195 of the actuator may sit on a valve assembly 200. The bonnet ring bore 210 of FIG. 1 is preferably threaded and adapted to receive reciprocal threading on the bonnet 195 of FIG. 1. The bonnet also possesses a bonnet bore 220 adapted to receive an internal packing retainer 175. The bonnet bore is preferably threaded and adapted to receive reciprocal threading on the exterior of the packing retainer 175. The packing retainer also has a packing retainer bore through which the operator shaft 125 may extend from the piston to the valve assembly 200 of FIG. 3.

In implementation, hydraulic fluid is inserted into the hydraulic pressure inlet port 140 and sits within the hydraulic chamber 160. The hydraulic fluid will exert pressure on the low profile actuator piston 170, forcing it in a proximal direction. The movement of the low profile actuator piston 170 in a proximal direction will push the top shaft receiver 105, the top shaft 115, the downstop 135, and the operator shaft 125 in a proximal direction, wherein the central spring 145 is compressed and the operator shaft 125 moves in a proximal direction through the packing retainer 175 and toward the bonnet 195.

The invention claimed is:

1. An actuator for moving a valve gate between open and closed valve positions within a valve body, the actuator comprising:
   a. an actuator housing having a proximal end oriented toward a gate valve and a distal end oriented away from the gate valve;
   b. an operator shaft with a distal end and a proximal end, the distal end having a partial bore for accepting a top shaft, the proximal end extending through a bore of a packing retainer fitted within an internal bore of a bonnet and into the valve body, the bonnet operatively connected to the proximal end of the actuator housing, and the operator shaft defining a shaft axis;
   c. a hydraulic pressure chamber aligned along the shaft axis and positioned distal to a piston, the piston having a proximal end and a distal end;
   d. a spring having an outer diameter, the spring being capable of producing a biasing force opposing axial movement of the operator shaft toward the valve body
   e. a downstop having a proximal side and a distal side and having a bore between the proximal side and distal side, the bore being adapted to receive the top shaft, the downstop further having a plurality of spring retainers extending proximally from the proximal side of the downstop and spaced annularly around the downstop, the spring retainers having an inner side oriented toward the spring such that the distance from the inner side of a spring retainer to the inner side of another spring retainer 180 degrees apart is greater than or equal to the outer diameter of the spring, the proximal ends of the spring retainers possessing indicator markers oriented away from the operator shaft; and
   wherein a change in hydraulic fluid pressure the hydraulic pressure chamber operatively results in movement of the piston in a proximal direction or distal direction, and wherein movement of the piston in a proximal or distal direction causes the operator shaft to move in a proximal direction or distal direction to open or close the gate valve.

2. The actuator of claim 1, wherein the actuator further comprises an indicator window located on the actuator housing, wherein the indicator window allows a user to view the indicator markers.

3. The actuator of claim 1, wherein the packing retainer has a distal end and is capable of receiving drift shims positioned on the distal end.

4. The actuator of claim 1, further comprising a top shaft with a distal end and a proximal end, the top shaft positioned proximal to the piston, the top shaft having a proximal end and distal end.

5. The actuator of claim 4, wherein the operator shaft has a distal end comprising a partial bore adapted to receive the proximal end of the top shaft.

6. The actuator of claim 5, wherein the downstop has a bore and is retained between the distal end of the top shaft and the distal end of the operator shaft.

7. The actuator of claim 1, wherein the actuator has a proximal end functioning as a bonnet ring with a bonnet ring bore.

8. The actuator of claim 7, wherein the bonnet ring bore is threaded and adapted to receive a threaded bonnet stem.

9. The actuator of claim 7, wherein the spring has a distal end in contact with the proximal side of the downstop and wherein the spring has a proximal end in contact with the bonnet ring.

10. A method of determining whether a gate valve without an external top shaft is in an open or closed valve position by a hydraulic actuator, the method comprising:
    a. obtaining a hydraulic actuator having an actuator housing with a side window and with the housing having a proximal end oriented toward a gate valve and a distal end oriented away from the gate valve, the actuator possessing a spring having an outer diameter, and a plurality of spring retainers, the spring retainers having an inner side oriented toward the spring such that the distance from the inner side of a spring retainer to the inner side of another spring retainer 180 degrees apart is greater than or equal to the outer diameter of the spring, the proximal ends of the spring retainers possessing at least one indicator marker oriented toward the side window;
    b. applying or removing hydraulic pressure from or to a hydraulic chamber, thereby causing a piston within the actuator and an indicator marker within the actuator to move in a proximal direction or distal direction; and
    wherein viewing the position of the at least one indicator marker via the side window allows a user to determine whether the valve is open or closed.

11. The method of claim 10, wherein the plurality of spring retainers have a proximal end and a distal end, the distal end of the spring retainers connected to a proximal end of a downstop.

12. The method of claim 10, wherein the valve is a fail closed valve and a distal position of an indicator relative to the side window indicates that the valve is closed.

13. The method of claim 12, wherein a proximal position of an indicator relative to the side window indicates that the valve is open.

14. The method of claim 10, wherein the side window is glass, acrylic, quartz or sapphire crystal.

15. The method of claim 10, wherein the side window is open and contains no transparent material.

* * * * *